United States Patent Office

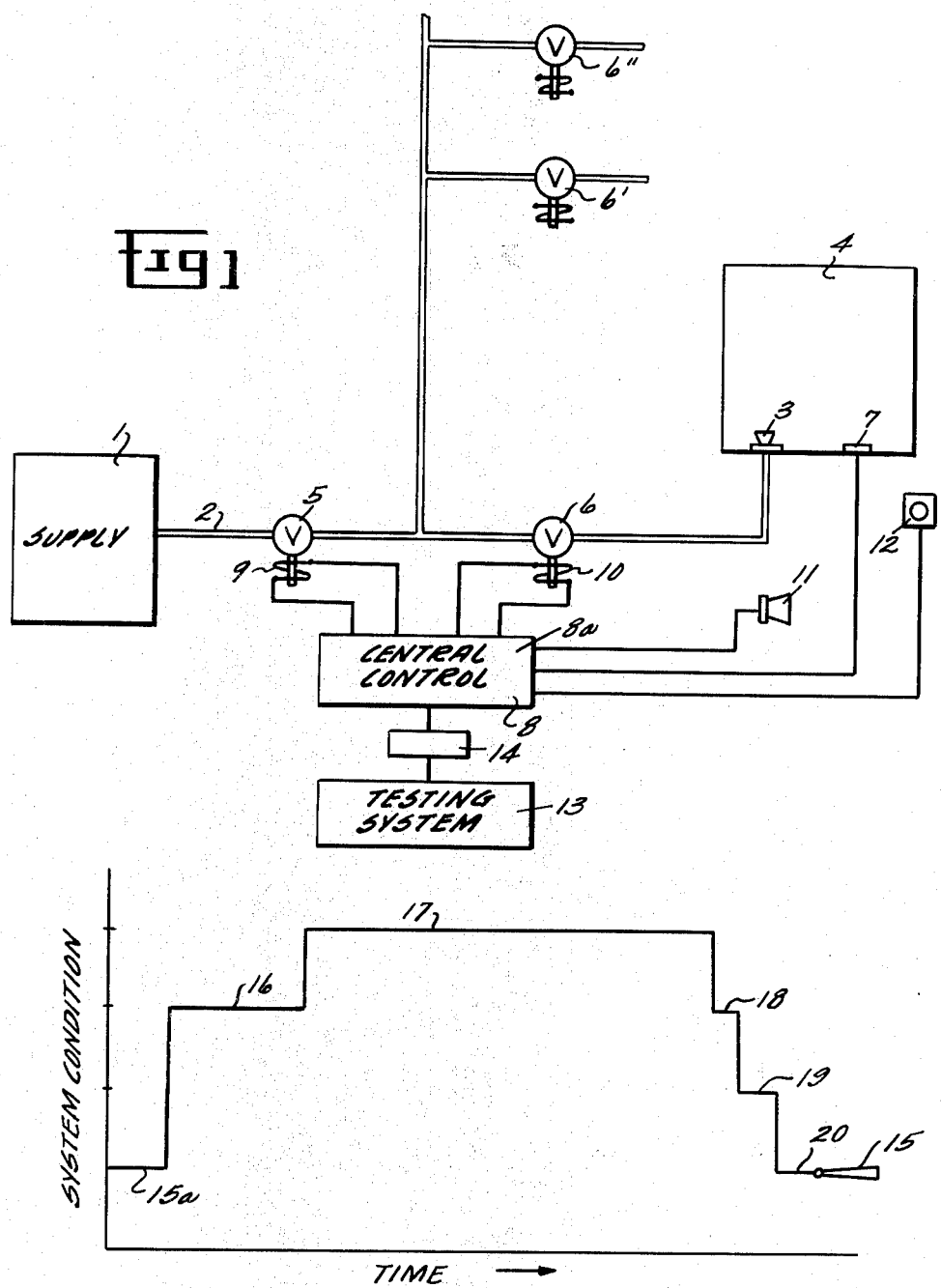

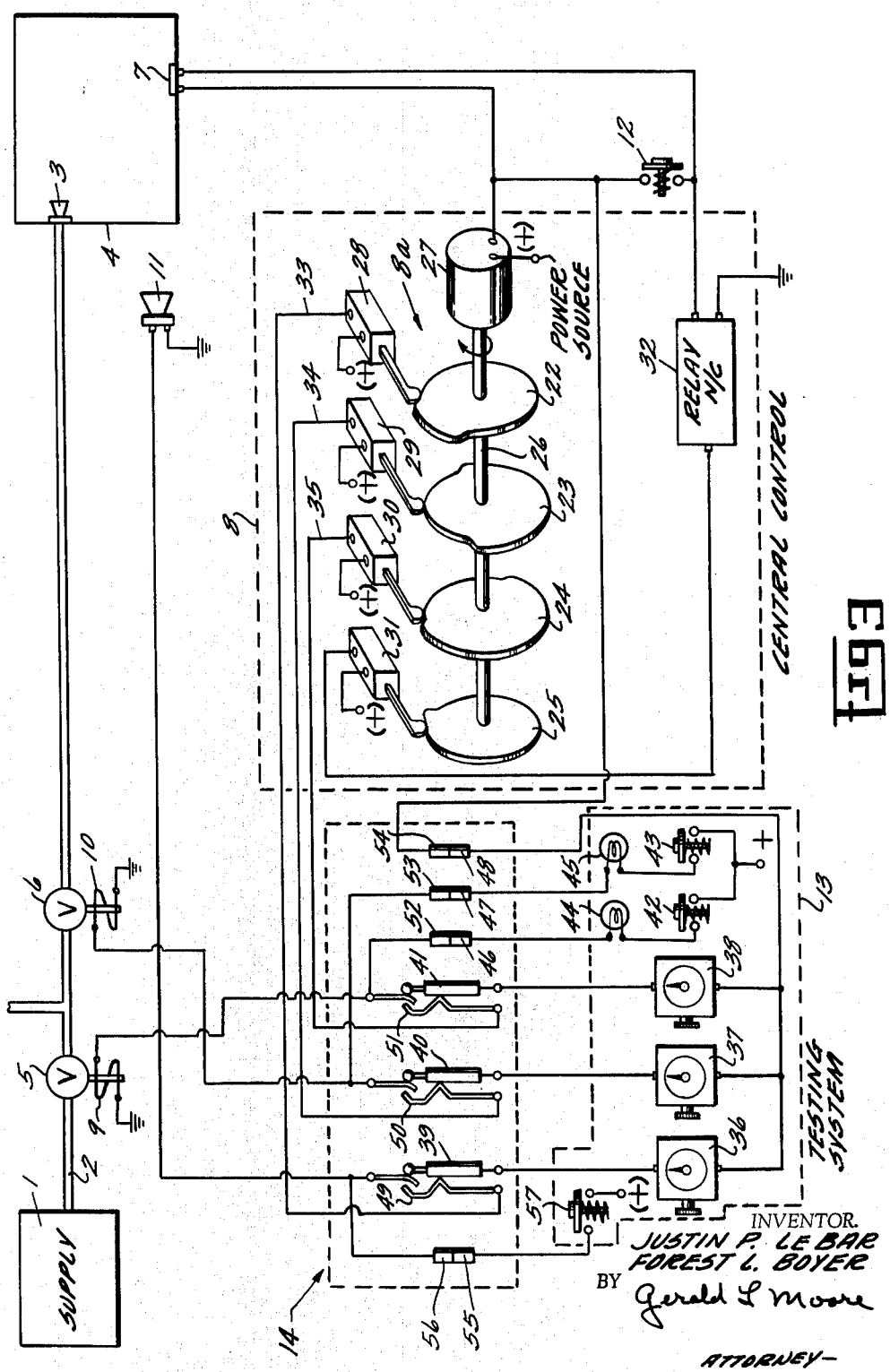

3,227,219
Patented Jan. 4, 1966

3,227,219
TESTING FOR A FIRE EXTINGUISHING SYSTEM
Forest L. Boyer, Lebanon, and Justin P. Le Bar, Cincinnati, Ohio, assignors to General Electric Company, a corporation of New York
Filed Dec. 19, 1963, Ser. No. 331,888
7 Claims. (Cl. 169—23)

This invention relates to testing devices and more specifically, to a testing or check out device for an automatic fire extinguishing system.

Automatic fire extinguishing systems are extensively employed today and generally comprise a central storage area for a fire extinguishing agent, piping and nozzle means permanently installed at spaced points throughout the area being protected for delivery of the extinguishing agent to the fire, fire detection means distributed throughout the area being protected and including means to transmit a signal to a central control device for receiving the detection signal, with the central control device generally comprising a master timer and valving mechanism to control the quantity of fire extinguishing agent delivered to the fire. The central control may also energize various warning devices to warn persons within the area of the danger.

Naturally such a system is seldom used but when needed, must function effectively to accomplish the fire extinguishing task. Because of the intermittent but absolutely necessary operation, the system must be checked periodically to determine its proper functioning, however, these devices are complex and such testing is difficult because of the extensive valving and circuitry. Also such testing cannot involve the utlimate complete energization of the system because of the cost and the effects of the extinguishing agent in the areas being protected.

In the past the testing of the system has involved the time consuming and painstaking task of disassembling the timer and circuitry from the valve and warning devices and individually inspecting the timer and valving devices to attempt to ascertain if they would function properly if energized. However it is obvious that such a checking system requires skilled personnel to determine whether or not the equipment will function if energized by a fire. Also there is no record of the testing results other than a notation by the tester.

Therefore, it is one object of the present invention to present a testing system for such an automatic fire extinguishing device which enables an operator to quickly and efficiently test the device to determine its operability.

It is another object of this invention to provide an improved fire extinguishing device and testing system combination which enables complete periodic checking of the device to determine its operability.

These and other objects are achieved by the present invention comprising means for disconnecting the fire extinguishing system central control from the valving and signal means of the system, means to test the master timer to determine its proper operability when energized through a complete cycle, means to selectively energize the valving and warning device means to determine their operability, and means to visually indicate and if desired, record the testing sequence so the operator can determine the operability of the fire extinguishing device.

The novel and distinctive features of the invention are set forth in the appended claims. The invention, itself, together with further objects and advantages thereof may be best understood by reference to the following description and accompanying drawings in which:

FIG. 1 is a block diagram of one embodiment of a fire extinguishing device and testing system in accordance with the present invention, FIG. 2 depicts graphically the time sequence of operation of a representative master timer of the fire extinguishing device, and FIG. 3 depicts schematically the fire extinguishing device and testing system of the present invention as shown in FIG. 1.

Referring to FIG. 1 there is shown in block diagram a typical fire extinguishing system with which the testing device of the present invention may be employed. A source of extinguishing agent 1 is connected through a line 2 to an injector nozzle 3 located in an area 4 which the system is installed to protect. The line 2 is provided with a master valve 5 and a plurality of selector valves 6, 6' and 6". The selector valve 6 controls the flow of extinguishing agent to the area 4 while the selector valve 6' and 6" control the flow of the agent to similar areas not shown. A temperature sensor 7 or other fire detector is located within the area 4 to energize a central control 8 when the temperature in the cell reaches a prescribed level. Central control 8 has a master timer 8a and cam members which successively excite the solenoids 9 and 10 to open the master valve 5 and the selector valve 6, respectively. The master timer 8a further serves to energize a warning horn 11 and such other necessary warning devices. A manual control switch 12 is also provided at the area to allow manual initiation of the operation of the master timer 8a in the central control 8. Additional control switches are connected to central control 8 for use at critical locations.

The operation of the system of FIG. 1 can most easily be understood by reference to the graphical representation in FIG. 2 of the time sequence of operation of the master timer 8a within central control 8, FIG. 3. Such a graph can be produced by graphical recorder having a single stylus 15 the position of which is controlled by the positioning of control elements of the master timer to impart a trace to a moving recording medium. Upon the occurrence of a fire in the area 4, the temperature sensor 7, or a manually depressed control switch, transmits a signal to the central control 8 causing the master timer 8a to be energized. This initial energizing of the master timer 8a is shown in FIG. 2 by the change from the rest position represented by line 15a to the condition represented by line 16. Almost immediately upon its energization the master timer 8a causes the warning horn 11 to be energized to thereby notify personnel in the vicinity of the area 4 that a fire has been detected. Simultaneously with the sounding of the warning horn the master timer causes the solenoid 9 to be excited thereby opening the master valve 5 and causing the extinguishing agent to flow from the source 1 to the selector valve 6. The point in the timer sequence when the master valve 5 and warning horn are excited is represented in FIG. 2 as the change from line 15a to line 16. Approximately 20 to 30 seconds after the timer has energized the master valve 5 the solenoid 10 is excited to thereby open the selector valve 6. The opening of the selector valve 6 is represented in FIG. 2 as a signal change from line 16 to line 17.

The opening of the selector valve 6 allows the extinguishing agent to flow through the line 2, through the injector nozzle 3 to the area 4 to flood the fire for a predetermined time as represented by the length of the line 17 in FIG. 2. After the extinguishing agent has flowed for a predetermined time the master timer 8a de-energizes the solenoid 9 thereby closing the master valve 5. The closing of the master valve 5 is represented in FIG. 2 as a change from line 17 to line 18. Approximately 3 to 5 seconds after the closing of the master valve 5 the master timer deactivates the solenoid 10 to close the selector valve 6, the timer interval between the closing of the master valve and the closing of the selector valve 6 allows the line 2 to purge itself of the extinguishing agent. The closing of the selector valve 6 is represented in FIG. 2 as the signal change from line 18 to 19. After a short time interval represented by the length of line 19 the system is returned to the rest position as represented by the change from line 19 to line 20.

Referring to FIG. 3 there is shown schematically an embodiment of the system of FIG. 1, with similar reference numerals being utilized to identify like elements. The central control 8 includes a master timer 8a comprising a plurality of cam members 22, 23, 24 and 25, the cam members being mounted on a shaft 26 rotated by a motor 27. These cam members 22, 23, 24 and 25 control the opening and closing of switches 28, 29, 30 and 31, respectively when the testing system is not connected to the central control by the connecting means 14. A normally closed relay 32 is provided in a circuit including the temperature sensor 7 leading to the motor 27, the state of the relay 32 being defined by the angular position of the cam member 25. A manual switch 12 is utilized to shunt the temperature sensor and apply power to the motor for manual excitation of the central control.

When the testing device is not connected to the central control, the closing of switch 28 completes a path through the line 33 to energize the warning horn 11. Similarly, the switch 29 completes a path through line 34 to energize the solenoid 10 while the switch 30 through the line 35 energizes the solenoid 9.

The tester 13 is utilized to test the operation of this complex system without actual energization of the total extingushing system and comprises interval timers 36, 37 and 38 which records the energization of the circuit leading to the warning horn 11, selector valve 6 and master valve 5, respectively. The interval timers 36, 37 and 38 are provided with plugs 39, 40 and 41, respectively, which are received by the connecting means 14, the plugs serve to break the circuit to the fire extinguishing apparatus comprising the valve and warning devices normally energized by the switches 28 through 30. The tester 13 also includes a pair of push-button switches 42 and 43 which allow the master valve 5 and selector valve 6, respectively, to be manually operated. The push-button switches 42 and 43 are provided with indicator lights 44 and 45, respectively, which become energized when the respective push-buttons are depressed. The push-button switches 42 and 43 are provided with connectors 46 and 47, respectively, which are received by the connecting means 14, a similar connector 48 being provided to apply power to the interval times 36, 37 and 38.

The connecting means 14 comprises spring jack members 49, 50 and 51 which complete the path from the switches 28, 29 and 30 when the timer-tester is not in place. The jack members 49, 50 and 51 are adapted to receive the plugs 39, 40 and 41, the lines to switches 28, 29 and 30 being interrupted when the plugs are so received. The connecting means is also provided with connnectors 52, 53 and 54 which engage the connectors 46, 47 and 48, respectively, of the timer-tester. Similar cooperating connectors 55 and 56 are provided for connecting a push-button 57 to the control line leading to the warning horn 11.

The general operation of the system of FIG. 3 is as outlined in connection with FIG. 1. When the tester is disconnected from the connecting means 14 by removal of the plugs 39, 40, 41, 46, 47, 48 and 55 the circuits from the central control to the various controlled elements are again completed for normal operation of the fire extinguishing system. Operation of the master timer 8a is initiated by the temperature sensor 7 or the closing of the manual switch 12 to complete the power circuit through the relay 32 to the motor 27. The motor rotates the shaft 26 to thereby rotate the cam members 22 through 25 to actuate the switches 28 through 31, respectively. Closing of the switches 28, 29 and 30 causes the warning horn 11, selector valve 6 and master valve 5 and such other necessary devices to be actuated in a time sequence as discussed in connection with FIG. 1 and as depicted in FIG. 2. Closing of the switch 31 by the cam member 25 effects resetting of the master timer at the end of the timing cycle by resetting the relay 32 and momentarily interrupting the circuit applying power to the motor 27.

When the time sequence of operation of the master timer 8 is to be checked, the timer-tester 13 is connected to the connecting means 14. Insertion of the plugs 39, 40 and 41 into the connecting means interrupts the circuits from the switches 28, 29 and 30 to the solenoids 9 and 10 and warning horn 11, respectively. Thus, operation of the master timer 8, which is initiated by closing the switch 12, will not cause either selector valve 6, the master valve 5, or the warning horn 11 to be operated. However, the time sequence of operation of the timer will be indicated and recorded by the timer-tester 13 which is now connected in circuit with the various switches since insertion of the plug 39 connects the interval timer 36 to the switch 28. Similarly, insertion of plugs 40 and 41 connect the interval timers 37 and 38 to switches 29 and 30, respectively. In this manner the time interval at which the respective switches are activated is recorded on the interval timers and optimum time sequence of operation is insured. The push-buttons 42, 43 and 57 of the timer-tester 13 can also be depressed momentarily to operate the master valve 5, the selector valve 6 and the warning horn 11, respectively, thus insuring that these elements are operable. The indicator lights 44 and 45 provide a visible indication when the push-buttons 42 and 43 are depressed. A graphic recorder can be substituted for the interval timers 36–38 shown in FIG. 3. Such a recorder is preferably one in which the inputs from the master timer would vary the position of a single recording stylus to produce a time plot of the sequence of operation of the master timer as shown in FIG. 2. In this manner a positive indication and if desired, a permanent record of the testing sequence may be obtained. Although the invention has been described with respect to a specific embodiment, it will be appreciated that modifications and changes may be made by those skilled in the art without departing from the spirit and scope of the invention.

What is claimed as new and desired to be secured by Letters Patent of the United States is:

1. Testing apparatus for a first extinguishing system of the type comprising,
   conduit means for connection with a source of fire extinguishing agent,
   valve means interposed in said conduit means and normally preventing flow of fire extinguishing agent therethrough,
   control means including a master timer for opening said valve means for a predetermined timed cycle, and
   means providing an operative connection from said control means to said valve means,
   said testing apparatus comprising,
   interval timers means and
   means for switching the operative connection of said control means from said valve means to said interval timer means,
   whereby the control means can be actuated and its operativeness tested by said interval timer means without discharge of said fire extinguishing agent.

2. Testing apparatus for a fire extinguishing system of the type comprising,
   conduit means for connection with a source of fire extinguishing agent,
   valve means interposed in said conduit means and normally preventing flow of fire extinguishing agent therethrough, and
   control means operatively connected to said valve means and including a master timer for opening said valve means for a predetermined time cycle,
said testing apparatus comprising,
interval timer means and
switching means for automatically disconnecting said control means from said valve means and connecting said control means to said interval timer means,
whereby the control means can be actuated and its operativeness tested by said interval timer means without discharge of said fire extinguishing agent.

3. Testing apparatus for a fire extinguishing system of the type comprising,
 a main conduit for connection with a source of fire extinguishing agent and a plurality of branch conduits therefrom, leading to selected areas for the discharge of fire extinguishing agent thereto,
 a master control valve interposed in said main conduit and secondary control valves respectively interposed in each of said branch conduits, said control valves being of the solenoid operated type and responsive to electrical energization for actuation from a normally closed position to an open position,
 control means for each of the areas to which a branch conduit leads,
 each control means having separate electrical outputs respectively connected to said main control valve and the secondary valve in the branch conduit for that area and further including a master timer for selectively energizing said outputs in a predetermined cycle for periods of selected duration,
 means for actuating said master timer in the event of a fire in said area,
 said testing apparatus comprising a pair of interval timers responsive to electrical energization,
 switching means for disconnecting the outputs of said control means from said valves and connecting said outputs respectively to said interval timers,
 whereby upon actuation of said control means the operativeness and accuracy of the master timer may be tested without discharge of fire extinguishing agent.

4. Apparatus as in claim 3 wherein the testing apparatus further comprises means for selectively and independently energizing said control valves for short periods of time whereby their operativeness may be tested without discharge of an undue amount of fire extinguishing agent.

5. Testing apparatus for a fire extinguishing system as in claim 3 wherein the fire extinguishing system further comprises
 a warning device actuated in response to electrical energization and
 the control means has a further electrical output connected to said warning device and the master timer includes means for selectively energizing said output in a predetermined cycle for a period of selected duration,
 and further wherein the testing apparatus comprises
 a third interval timer responsive to electrical energization and
 switching means for disconnecting said further output for said warning device and connecting it to said third interval timer whereby the operativeness and accuracy of the master timer may be tested with respect to the alarm device as well.

6. Testing apparatus as in claim 5 wherein means are provided for selectively and independently actuating the alarm device for a short period of time in testing the fire extinguishing system.

7. Testing apparatus as in claim 3 wherein means are provided for graphically recording the operation of said interval timers to provide a permanent record of the testing of the fire extinguishing system.

References Cited by the Examiner
UNITED STATES PATENTS

| | | | |
|---|---|---|---|
| 2,185,394 | 1/1940 | Arbogast | 169—16 X |
| 2,674,490 | 4/1954 | Richards | 239—66 X |
| 2,758,657 | 8/1956 | Williamson et al. | 169—9 |
| 2,821,434 | 1/1958 | Hunter et al. | 239—66 X |
| 2,899,258 | 8/1959 | Spracklen | 346—34 |
| 2,933,139 | 4/1960 | O'Rear | 169—23 X |

FOREIGN PATENTS
321,085   10/1929   Great Britain.

M. HENSON WOOD, Jr., *Primary Examiner.*

EVERETT W. KIRBY, *Examiner.*